United States Patent
Li et al.

(10) Patent No.: US 11,046,593 B2
(45) Date of Patent: Jun. 29, 2021

(54) SYSTEM FOR TREATING REVERSE-OSMOSIS CONCENTRATED WATER WITH PERMANENT HARDNESS

(71) Applicant: Greentech Environment Co., Ltd., Beijing (CN)

(72) Inventors: Zehua Li, Beijing (CN); Mu Liu, Beijing (CN); Qiaoyun Zhang, Beijing (CN); Huiming Han, Beijing (CN); Yuan Liu, Beijing (CN); Yingqiang Su, Beijing (CN); Hexing Zhang, Beijing (CN)

(73) Assignee: Greentech Environment Co., Ltd., Beijing (CN)

( * ) Notice: Subject to any disclaimer, the term of this patent is extended or adjusted under 35 U.S.C. 154(b) by 0 days.

(21) Appl. No.: 16/660,739

(22) Filed: Oct. 22, 2019

(65) Prior Publication Data
US 2020/0189937 A1 Jun. 18, 2020

Related U.S. Application Data

(63) Continuation of application No. PCT/CM2019/106190, filed on Sep. 17, 2019.

(30) Foreign Application Priority Data
Dec. 16, 2018 (CN) .......................... 201811538416.3

(51) Int. Cl.
C02F 1/44 (2006.01)
C02F 1/52 (2006.01)
C02F 1/00 (2006.01)

(52) U.S. Cl.
CPC ................ *C02F 1/441* (2013.01); *C02F 1/52* (2013.01); *C02F 2001/007* (2013.01); *C02F 2001/5218* (2013.01)

(58) Field of Classification Search
CPC ..... C02F 1/441; C02F 5/06; C02F 2001/5218
See application file for complete search history.

(56) References Cited

U.S. PATENT DOCUMENTS

| | | | | |
|---|---|---|---|---|
| 4,314,779 A | * | 2/1982 | Sundar .................... | C02F 1/281 166/266 |
| 4,618,429 A | | 10/1986 | Herrigel | |
| 2014/0131280 A1 | * | 5/2014 | Haseneder ................ | C02F 9/00 210/638 |

FOREIGN PATENT DOCUMENTS

| | | | |
|---|---|---|---|
| CN | 104276711 A | | 1/2015 |
| CN | 104291511 A | | 1/2015 |
| CN | 104326591 A | * | 2/2015 |

(Continued)

OTHER PUBLICATIONS

Zhang Qian—CN-104326591-A machine translation (Year: 2015).*
(Continued)

*Primary Examiner* — Bradley R Spies

(57) ABSTRACT

The invention relates to sewage treatment, and more particularly to a system for treating reverse-osmosis concentrated water with permanent hardness. The system includes a first crystallization unit, a first reverse osmosis unit, a second crystallization unit, a lime softening unit and a second reverse osmosis unit, which are connected in sequence. The system of the invention is able to eliminate the permanent hardness and the temporary hardness of the concentrated brine, and the hardness can be reduced to equal to or less than 50 mg/L.

6 Claims, 2 Drawing Sheets

(56) References Cited

FOREIGN PATENT DOCUMENTS

| CN | 104326612 A | * | 2/2015 | |
|---|---|---|---|---|
| CN | 105000741 A | | 10/2015 | |
| CN | 106630352 A | | 5/2017 | |
| CN | 108939662 A | * | 12/2018 | |
| CN | 109592815 A | | 4/2019 | |
| WO | WO-2009119299 A1 | * | 10/2009 | ......... B01D 21/0042 |

OTHER PUBLICATIONS

Liu Meng—CN-108939662-A machine translation (Year: 2018).*
Cao Huizhong—CN-104326612-A machine translation (Year: 2015).*
Matsui Yasuhiro—WO-2009119299-A1 machine translation (Year: 2009).*
Veolia—ACTIFLO process for drinking water treatment (Year: 2017).*
Ning, Robert Y et al—Recovery optimization of RO concentrate from desert wells—Desalination (Year: 2006).*

* cited by examiner

SYSTEM FOR TREATING REVERSE-OSMOSIS CONCENTRATED WATER WITH PERMANENT HARDNESS

CROSS-REFERENCE TO RELATED APPLICATIONS

This application is a continuation of International Patent Application No. PCT/CN2019/106190, filed on Sep. 17, 2019, which claims the benefit of priority from Chinese Patent Application No. 201811538416.3, filed on Dec. 16, 2018. The content of the aforementioned application, including any intervening amendments thereto, is incorporated herein by reference in its entirety.

TECHNICAL FIELD

This application relates to sewage treatment, and more particularly to a system for treating reverse-osmosis concentrated water with permanent hardness.

BACKGROUND OF THE INVENTION

Currently, a large amount of sulfate wastewater produced in the industries of petrochemical technology, electric power and chemical fiber can be reused after being treated by reverse osmosis. However, how to treat the high-hardness concentrated water simultaneously generated from the reverse osmosis process has become a new technical and economical problem since the concentrated water will definitely pollute the surrounding environment after being directly discharged. Therefore, it is of great challenge and significance to recycle or re-treat the concentrated water to achieve zero emission in the desalination process. Currently, the concentrated water with high permanent hardness is generally treated by converting the permanent hardness (i.e., calcium sulfate) into temporary hardness (i.e., calcium carbonate), which is then removed by crystallization. However, the introduction of foreign materials in this process has led to an increased burden in the downstream treatment. In addition, the water production rate of the reverse osmosis is generally only 75%, which indicates a high production of concentrated salt water, and due to the presence of scale inhibitor, it becomes more difficult to complete the crystallization and separation. Besides, the zero-emission process involves the large consumption of energy because of the use of the strongly evaporative crystallization, and the introduction of carbonate as a softener also increases the cost. Therefore, there is an urgent need to develop a simple and efficient crystallization technique to recycle the sulfate in the water.

SUMMARY OF THE INVENTION

An object of the invention is to solve at least one of the above-mentioned problems in the prior art, and is achieved through the following technical solutions.

The invention provides a system for treating reverse-osmosis concentrated water with permanent hardness, which includes a first crystallization unit, a first reverse osmosis unit, a second crystallization unit, a lime softening unit and a second reverse osmosis unit, connected in sequence.

The first crystallization unit includes a first crystallizer, a first thickener and a first centrifugal dehydrator; an inlet of the first crystallizer is connected to a concentrated brine inlet pipe and a first feeding container configured to feed a first flocculant and a first seed crystal; an inlet of the first thickener is connected to a first crystal mush outlet of the first crystallizer; and an outlet of the first thickener is connected to an inlet of the first centrifugal dehydrator.

The first reverse osmosis unit includes a first multi-media filter and a first reverse osmosis membrane device; an inlet of the first multi-media filter is connected to a water outlet of the first crystallizer, a water outlet of the first thickener and a water outlet of the first centrifugal dehydrator; an outlet of the first multi-media filter is connected to an inlet of the first reverse osmosis membrane device; and the first reverse osmosis membrane device is provided with a first outlet and a second outlet, wherein the first outlet is configured for the discharging of water capable of permeating through a reverse osmosis membrane and the second outlet is configured for the discharging of concentrated brine failing to permeate through the reverse osmosis membrane.

The second crystallization unit includes a second crystallizer, a second thickener and a second centrifugal dehydrator; an inlet of the second crystallizer is connected to the second outlet of the first reverse osmosis membrane device and a second feeding container configured to feed a second flocculant and a second seed crystal; an inlet of the second thickener is connected to a second crystal mush outlet of the second crystallizer; and an outlet of the second thickener is connected to an inlet of the second centrifugal dehydrator.

The lime softening unit includes a quicklime reaction tank, a coagulation sedimentation tank, a flocculation sedimentation tank and a sedimentation tank, connected successively. An inlet of the quicklime reaction tank is connected to a water outlet of the second crystallizer, a water outlet of the second thickener and a water outlet of the second centrifugal dehydrator.

The second reverse osmosis unit includes a second multi-media filter and a second reverse osmosis membrane device. An inlet of the second multi-media filter is connected to a water outlet of the sedimentation tank. An outlet of the second multi-media filter is connected to an inlet of the second reverse osmosis membrane device.

The lime softening unit further includes a third thickener and a third centrifugal dehydrator. An inlet of the third thickener is connected to a feed outlet of the sedimentation tank. An outlet of the third thickener is connected to an inlet of the centrifugal dehydrator. The second multi-media filter is connected to a water outlet of the third thickener and a water outlet of the third centrifugal dehydrator.

The first crystallizer includes a first crystallization tank, a first draft tube, a first agitator and a first cover; and the second crystallizer includes a second crystallization tank, a second draft tube, a second agitator and a second cover;

the first draft tube and the second draft tube are respectively provided in the first crystallization tank and the second crystallization tank; the first agitator and the second agitator are both a propeller agitator and are respectively provided in the first draft tube and the second draft tube;

the inlet of the first crystallizer and the inlet of the second crystallizer are respectively provided at a middle lower part of the first crystallization tank and a middle lower part of the second crystallization tank;

the first crystal mush outlet and the second crystal mush outlet are respectively provided at a bottom of the first crystallization tank and a bottom of the second crystallization tank;

a first clarification zone and a second clarification zone are respectively provided on an upper portion of the first crystallization tank and an upper portion of the second crystallization tank;

a first annular chamber is formed between a top of the first crystallization tank and an outer wall of the first cover, and a second annular chamber is formed between a top of the second crystallization tank and an outer wall of the second cover;

the water outlet of the first crystallizer and the water outlet of the second crystallizer are respectively provided at a bottom of the first annular chamber and a bottom of the second annular chamber;

the top of the first crystallization tank is provided with a first divergent section expanding outward at an angle of 30° and the top of the second crystallization tank is provided with a second divergent section expanding outward at an angle of 30°; a first overflow baffle and a second overflow baffle are vertically arranged at a top of the first divergent section and a top of the second divergent section, respectively;

the first clarification zone is formed between the first divergent section and the first overflow baffle, and the second classification zone is formed between the second divergent section and the second overflow baffle; and the first annular chamber is formed between the first overflow baffle and the outer wall of the first cover, and the second annular chamber is formed between the second overflow baffle and the outer wall of the second cover.

A bottom of the first multi-media filter and a bottom of the second multi-media filter are respectively communicated with a first cleaning fan and a second cleaning fan; the first multi-media filter and the second multi-media filter are respectively provided with a first backwash wastewater outlet and a second backwash wastewater outlet; the first backwash wastewater outlet is connected to the inlet of the first crystallizer, and the second backwash wastewater outlet is connected to the inlet of the quicklime reaction tank.

The sedimentation tank is a sloping plate sedimentation tank; a quicklime feeding container is provided on the quicklime reaction tank; a coagulant feeding container is provided on the coagulation sedimentation tank; a flocculant feeding container is provided on the flocculation sedimentation tank; the inlet of the first reverse osmosis membrane device is further connected to a scale inhibitor feeding device and a reducer feeding device; a bottom of the first reverse osmosis membrane device is connected to a first chemical cleaning device, and a bottom of the second reverse osmosis membrane device is connected to a second chemical cleaning device.

The invention has the following beneficial effects.

1. The system of the invention is able to eliminate the permanent hardness and the temporary hardness of the concentrated water, and the hardness can be reduced to equal to or less than 50 mg/L.

2. Compared to the traditional method in which sodium sulfate is employed to treat the permanent hardness, this invention requires no additional agent, lowering the cost and reducing the difficulty in further treating sulfate in the subsequent process.

3. The reverse-osmosis concentrated water is treated by cascade filtration herein, so that the water resource can be recycled several times, thereby increasing the output of the reclaimed water.

4. In the invention, the inducing crystallization is combined with reverse osmosis to ensure that more than 90% of calcium sulfate can be recycled by the cascade device and the calcium sulfate has a purity equal to or more than 97%, achieving the recycling of the pollutants in water.

BRIEF DESCRIPTION OF THE DRAWINGS

The benefits and advantages of the invention will be clearly understood by those skilled in the art with reference to the embodiments described below. The accompanying drawings are only intended to illustrate the preferred embodiments, and are not intended to limit the invention. In the drawings, the same member is marked with the same reference sign.

DETAILED DESCRIPTION OF EMBODIMENTS

Figure 1:
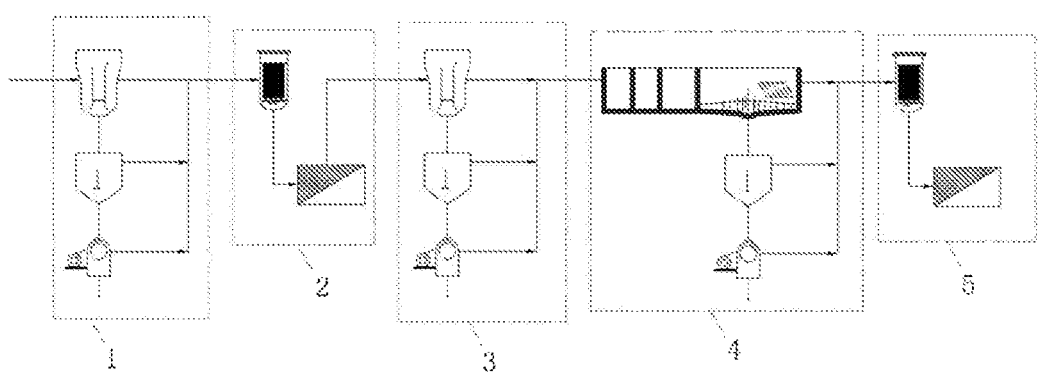
FIG. 1 is a flow chart of the system according to an embodiment of the invention.

Embodiments of the invention will be described in more detail below with reference to the accompanying drawings. Though the embodiments of the invention are shown in the drawings, it should be understood that the invention may be implemented in various modes and should not be limited thereto. These embodiments provided herein are intended to make those skilled in the art fully and clearly understand the invention.

It should be understood that the terms used herein are only illustration of the embodiments and are not intended to limit the invention. Unless otherwise defined, terms "a", "an" and "the", can also represent plural forms. Terms "include", "contain", "comprise" and "have" are inclusive, and indicate the existence of the recited features, steps, operations, components and/or members, but do not exclude the presence or addition of one or more other features, steps, operations, components, members and/or a combination thereof.

The terms "first", "second" and "third" are used herein to describe a plurality of components, members, zones, layers and/or sections, but are not intended to limit these components, members, zones, layers and/or sections. These terms may be only used to distinguish one component, member, zone, layer or section from another component, member, zone, layer or section. Unless otherwise defined, the terms, such as "first" and "second", and other numerical terms used herein are not referred to the order or sequence. Thus, a first component, member, zone, layer or section may be referred to as a second component, member, zone, layer or section without departing from the teachings of the embodiments.

For the convenience of description, directional terms may be used herein to describe the relationship between one component or feature and another component or feature shown in the drawings, such as "in", "out", "inside", "outside", "below", "under", "above", "on", etc. These directional terms are intended to include different orientations of the device during the operation in addition to the orientation described in the drawings. For example, when the device in the drawings is turned over, the description "below other components or features" or "under other components or features" should be correspondingly amended to "above other components or features" or "on other components or features". Therefore, the term "under" may contain both lower and upper directions. The device can be oriented in other manners (for example, the device is rotated 90° or oriented in other directions) and the directional relationship can be accordingly described using the terms mentioned herein.

As shown in FIG. 1, the invention provides a system for treating reverse-osmosis concentrated water with permanent hardness, which includes a first crystallization unit 1, a first reverse osmosis unit 2, a second crystallization unit 3, a lime softening unit 4 and a second reverse osmosis unit 5, connected in sequence.

Figure 2:
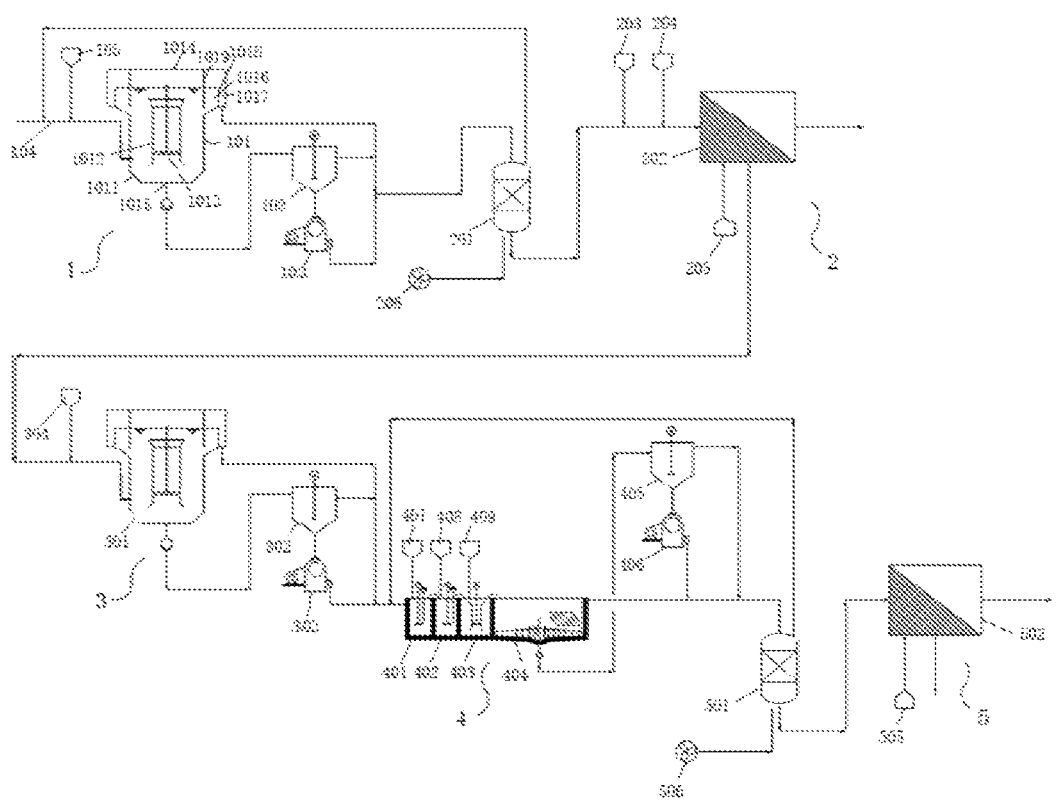
FIG. 2 schematically shows the structure of the system according to an embodiment of the invention.

As shown in FIG. 2, the first crystallization unit 1 includes a first crystallizer 101, a first thickener 102 and a first centrifugal dehydrator 103, where an inlet of the first crystallizer 101 is connected to a concentrated brine inlet pipe 104 and a first feeding container 105 configured to feed a first flocculant and a first seed crystal; an inlet of the first thickener 102 is connected to a first crystal mush outlet of the first crystallizer 101; and an outlet of the first thickener 102 is connected to an inlet of the first centrifugal dehydrator 103.

The first reverse osmosis unit 2 includes a first multimedia filter 201 and a first reverse osmosis membrane device 202, where an inlet of the first multi-media filter 201 is connected to a water outlet of the first crystallizer 101, a water outlet of the first thickener 102 and a water outlet of the first centrifugal dehydrator 103; an outlet of the first multi-media filter 201 is connected to an inlet of the first reverse osmosis membrane device 202; and the first reverse osmosis membrane device 202 is provided with a first outlet and a second outlet, wherein the first outlet is configured for the discharging of water capable of permeating through a reverse osmosis membrane and the second outlet is configured for the discharging of concentrated brine failing to permeate through the reverse osmosis membrane.

The second crystallization unit 3 includes a second crystallizer 301, a second thickener 302 and a second centrifugal dehydrator 303, where an inlet of the second crystallizer 301 is connected to the second outlet of the first reverse osmosis membrane device 202 and a second feeding container 304 configured to feed a second flocculant and a second seed crystal; an inlet of the second thickener 302 is connected to a second crystal mush outlet of the second crystallizer 301; and an outlet of the second thickener 302 is connected to an inlet of the second centrifugal dehydrator 303.

The lime softening unit 4 includes a quicklime reaction tank 401, a coagulation sedimentation tank 402, a flocculation sedimentation tank 403 and a sedimentation tank 404, which are sequentially connected. An inlet of the quicklime reaction tank 401 is connected to a water outlet of the second crystallizer 301, a water outlet of the second thickener 302 and a water outlet of the second centrifugal dehydrator 303.

The second reverse osmosis unit 5 includes a second multi-media filter 501 and a second reverse osmosis membrane device 502. An inlet of the second multi-media filter 501 is connected to a water outlet of the sedimentation tank 404. An outlet of the second multi-media filter 501 is connected to an inlet of the second reverse osmosis membrane device 502.

The lime softening unit 4 further includes a third thickener 405 and a third centrifugal dehydrator 406. An inlet of the third thickener 405 is connected to a feed outlet of the sedimentation tank 404. An outlet of the third thickener 405 is connected to an inlet of the centrifugal dehydrator 406. The second multi-media filter 501 is connected to a water outlet of the third thickener 405 and a water outlet of the third centrifugal dehydrator 406.

Further, only the first crystallizer 101 is taken as an example for description below since it is the same with the second crystallizer 301 in structure.

The first crystallizer 101 includes a first crystallization tank 1011, a first draft tube 1012, a first agitator 1013, and a first cover 1014. The first agitator 1013 is a propeller agitator and is provided in the first draft tube 1012, while the first draft tube 1012 is provided in the first crystallization tank 1011. The inlet of the first crystallizer 101 is provided at a middle lower part of the first crystallization tank 1011. The first crystal slurry outlet 1015 is provided at a bottom of the first crystallization tank 1011. A first clarification zone 1016 is provided on an upper portion of the first crystallization tank 1011. A first annular chamber 1017 is formed between a top of the first crystallization tank 1011 and an outer wall of the first cover 1014. The water outlet of the first crystallizer 101 is provided at a bottom of the first annular chamber 1017.

When the first crystallizer 101 is under operation, the water is driven to flow downward along an inner wall of the first draft tube 1012 and to flow upward along an outer wall of the first draft tube 1012 under the action of the first agitator 1013, forming a circle. By controlling the rotation speed of the first agitator 1013, the rate at which the water is driven to flow upward and downward can be adjusted to nine times the flow rate of the concentrated brine entering the first crystallizer 101, which indicates that a reflux rate of the crystalline liquid is 800%.

The top of the first crystallization tank 1011 is provided with a first divergent section expanding outward at an angle of 30°. A first overflow baffle 1018 is vertically arranged at a top of the first divergent section. The first clarification zone 1016 is formed between the first divergent section, the first overflow baffle 1018 and a first clarification baffle 1019. The first annular chamber 1017 is formed between the first overflow baffle 1018 and the outer wall of the first cover 1014. The brine obtained by the crystallization to eliminate the permanent hardness overflows from the first overflow baffle 1018 to a water outlet, and then to the first reverse osmosis unit 2.

A bottom of the first multi-media filter 201 is communicated with a first cleaning blower 206, and a bottom of the second multi-media filter 501 is communicated with a second cleaning blower 506. The first multi-media filter 201 and the second multi-media filter 501 are respectively provided with a first backwash wastewater outlet and a second backwash wastewater outlet. The first backwash wastewater outlet is connected to the inlet of the first crystallizer 101, so that the backwash wastewater is allowed to flow back to the first crystallizer 101 for crystallization and then to be treated by the first multi-media filter 201 without producing excess wastewater.

The second backwash wastewater outlet is connected to the inlet of the quicklime reaction tank 401, so that the backwash wastewater is allowed to flow back to the quicklime reaction tank 401 for re-treatment without producing excess wastewater.

The sedimentation tank 404 is a sloping plate sedimentation tank. A quicklime feeding container 407 is provided on the quicklime reaction tank 401. A coagulant feeding container 408 is provided on the coagulation sedimentation tank 402, and a flocculant feeding container 409 is provided on the flocculation sedimentation tank 403.

The inlet of the first reverse osmosis membrane device 202 is further connected to a scale inhibitor feeding device 203 and a reducer feeding device 204.

A bottom of the first reverse osmosis membrane device 202 is connected to a first chemical cleaning device 205, and a bottom of the second reverse osmosis membrane device 502 is connected to a second chemical cleaning device 505, enabling periodic cleaning of the reverse osmosis membrane device.

The invention further provides a process of treating reverse osmosis concentrated water with permanent hardness using the system of the invention.

1) The reverse osmosis concentrated brine was introduced into the first crystallizer 101 via the brine inlet pipe 104. Meanwhile, a flocculant capable of eliminating the dispersing effect of a scale inhibitor and calcium sulfate seed crystal capable of promoting the crystal growth were added into the first crystallizer 101 via the first feeding container 105 to perform the crystallization of the concentrated brine. The crystal mush generated in the crystallization was concentrated in the first thickener 102 and then delivered to the first centrifugal dehydrator 103 for dehydration to give calcium sulfate with a low water content. The water separated in the crystallization was a brine with the permanent hardness partially eliminated, which was delivered to the first reverse osmosis unit 2 together with the water separated from the first thickener 102 and the first centrifugal dehydrator 103.

2) After delivered to the first reverse osmosis unit 2, the brine was treated by the first multi-media filter 201 to remove the suspended solids and fine-grained particles and then flowed to the first reverse osmosis membrane device 202 for filtration. The filtered water was reused as reclaimed water and the reverse-osmosis concentrated water failing to pass through the membrane was transported to the second crystallization unit 3.

3) The concentrated water in the second crystallization unit 3 was treated in the same manner as that used in the first crystallization unit 1. The water separated in the crystallization was a brine with the permanent hardness completely eliminated, which was then delivered to the lime softening unit 4 together with the water separated from the second thickener 302 and the second centrifugal dehydrator 303.

4) After delivered to the lime softening unit 4, the brine was reacted with $Ca(OH)_2$ in the quicklime reaction tank 401 to form calcium carbonate. Magnesium ions were also precipitated in the form of magnesium carbonate at a pH of 11. Afterwards, the brine was sequentially added with a coagulant in the coagulation sedimentation tank 402 and a flocculant in the flocculation sedimentation tank 403, and then the sedimentation was performed in the sedimentation tank 404 to achieve the solid-liquid separation. The separated liquid was a brine with the temporary hardness eliminated.

5) The water with the permanent hardness and temporary hardness both eliminated was delivered to the second multi-media filter 501 to remove the suspended solids and fine-grained particles and then filtered in the second reverse osmosis membrane device 502. The water was recycled again as reclaimed water and a further concentrated brine was also obtained.

The retention time of the reverse-osmosis concentrated water in the first crystallizer 101 and the second crystallizer 301 was less than 1.5 h, preferably 1 h.

Described above are only preferred embodiments of the invention, and are not intended to limit the invention. Variations and replacements made by those skilled in the art without departing from the spirit of the invention should fall within the scope of the invention defined by the appended claims.

What is claimed is:

1. A system for treating reverse-osmosis concentrated water with permanent hardness, comprising a first crystallization unit, a first reverse osmosis unit, a second crystallization unit, a lime softening unit and a second reverse osmosis unit, wherein the first crystallization unit, the first reverse osmosis unit, the second crystallization unit, the lime softening unit and the second reverse osmosis unit are connected in sequence;

the first crystallization unit comprises a first crystallizer, a first thickener and a first centrifugal dehydrator;

an inlet of the first crystallizer is connected to a concentrated brine inlet pipe and a first feeding container configured to feed a first flocculant and a first seed crystal;

an inlet of the first thickener is connected to a first crystal mush outlet of the first crystallizer;

an outlet of the first thickener is connected to an inlet of the first centrifugal dehydrator;

the first reverse osmosis unit comprises a first multi-media filter and a first reverse osmosis membrane device;

an inlet of the first multi-media filter is connected to a water outlet of the first crystallizer, a water outlet of the first thickener and a water outlet of the first centrifugal dehydrator;

an outlet of the first multi-media filter is connected to an inlet of the first reverse osmosis membrane device;

the first reverse osmosis membrane device is provided with a first outlet and a second outlet, wherein the first outlet is configured for the discharging of water capable of permeating through a reverse osmosis membrane and the second outlet is configured for the discharging of concentrated brine failing to permeate through the reverse osmosis membrane;

the second crystallization unit comprises a second crystallizer, a second thickener and a second centrifugal dehydrator;

an inlet of the second crystallizer is connected to the second outlet of the first reverse osmosis membrane device and a second feeding container configured to feed a second flocculant and a second seed crystal;

an inlet of the second thickener is connected to a second crystal mush outlet of the second crystallizer;

an outlet of the second thickener is connected to an inlet of the second centrifugal dehydrator;

the first crystallizer comprises a first crystallization tank, a first draft tube, a first agitator and a first cover; and the second crystallizer comprises a second crystallization tank, a second draft tube, a second agitator and a second cover;

the first draft tube and the second draft tube are respectively provided in the first crystallization tank and the second crystallization tank; the first agitator and the second agitator are both a propeller agitator and are respectively provided in the first draft tube and the second draft tube;

the inlet of the first crystallizer and the inlet of the second crystallizer are respectively provided at a middle lower part of the first crystallization tank and a middle lower part of the second crystallization tank;

the first crystal mush outlet and the second crystal mush outlet are respectively provided at a bottom of the first crystallization tank and a bottom of the second crystallization tank;

a first clarification zone and a second clarification zone are respectively provided on an upper portion of the first crystallization tank and an upper portion of the second crystallization tank;

a first annular chamber is formed between a top of the first crystallization tank and an outer wall of the first cover, and a second annular chamber is formed between a top of the second crystallization tank and an outer wall of the second cover;

the water outlet of the first crystallizer and the water outlet of the second crystallizer are respectively provided at a bottom of the first annular chamber and a bottom of the second annular chamber;

the top of the first crystallization tank is provided with a first divergent section expanding outward at an angle of 30° and the top of the second crystallization tank is provided with a second divergent section expanding outward at an angle of 30°; a first overflow baffle and a second overflow baffle are vertically arranged at a top of the first divergent section and a top of the second divergent section, respectively;

the first clarification zone is formed between the first divergent section and the first overflow baffle, and the second classification zone is formed between the second divergent section and the second overflow baffle; and the first annular chamber is formed between the first overflow baffle and the outer wall of the first cover, and the second annular chamber is formed between the second overflow baffle and the outer wall of the second cover.

2. The system of claim 1, wherein the lime softening unit comprises a quicklime reaction tank, a coagulation sedimentation tank, a flocculation sedimentation tank and a sedimentation tank, and the quicklime reaction tank, the coagulation sedimentation tank, the flocculation sedimentation tank and the sedimentation tank are sequentially connected; and an inlet of the quicklime reaction tank is connected to a water outlet of the second crystallizer, a water outlet of the second thickener and a water outlet of the second centrifugal dehydrator.

3. The system of claim 2, wherein the second reverse osmosis unit comprises a second multi-media filter and a second reverse osmosis membrane device;

a water outlet of the sedimentation tank is connected to an inlet of the second multi-media filter; and an outlet of the second multi-media filter is connected to an inlet of the second reverse osmosis membrane device.

4. The system of claim 3, wherein the lime softening unit further comprises a third thickener and a third centrifugal dehydrator;

an inlet of the third thickener is connected to a precipitate outlet of the sedimentation tank;

an outlet of the third thickener is connected to an inlet of the centrifugal dehydrator; and a water outlet of the third thickener and a water outlet of the third centrifugal dehydrator are connected to the inlet of the second multi-media filter.

5. The system of claim 3, wherein a bottom of the first multi-media filter and a bottom of the second multi-media filter are respectively communicated with a first cleaning fan and a second cleaning fan;

the first multi-media filter and the second multi-media filter are respectively provided with a first backwash wastewater outlet and a second backwash wastewater outlet;

the first backwash wastewater outlet is connected to the inlet of the first crystallizer, and the second backwash wastewater outlet is connected to the inlet of the quicklime reaction tank.

6. The system of claim 3, wherein the sedimentation tank is a sloping plate sedimentation tank;

a quicklime feeding container is provided on the quicklime reaction tank;

a coagulant feeding container is provided on the coagulation sedimentation tank;

a flocculant feeding container is provided on the flocculation sedimentation tank;

the inlet of the first reverse osmosis membrane device is further connected to a scale inhibitor feeding device and a reducer feeding device;

a bottom of the first reverse osmosis membrane device is connected to a first chemical cleaning device, and a bottom of the second reverse osmosis membrane device is connected to a second chemical cleaning device.

* * * * *